(12) United States Patent
Miller (10) Patent No.: US 9,605,622 B2
(45) Date of Patent: Mar. 28, 2017

(54) METHOD AND APPARATUS FOR SUPPLYING HEATED, PRESSURIZED AIR

(71) Applicant: PL Propylene LLC, Houston, TX (US)

(72) Inventor: Randy Miller, Kingwood, TX (US)

(73) Assignee: Flint Hills Resources, LP, Houston, TX (US)

( * ) Notice: Subject to any disclaimer, the term of this patent is extended or adjusted under 35 U.S.C. 154(b) by 718 days.

(21) Appl. No.: 13/656,234

(22) Filed: Oct. 19, 2012

(65) Prior Publication Data
US 2013/0098457 A1    Apr. 25, 2013

Related U.S. Application Data

(60) Provisional application No. 61/550,156, filed on Oct. 21, 2011.

(51) Int. Cl.
| F02K 1/82 | (2006.01) |
|---|---|
| F02C 6/04 | (2006.01) |
| F02C 6/18 | (2006.01) |
| F16L 27/11 | (2006.01) |
| F16L 51/02 | (2006.01) |

(52) U.S. Cl.
CPC ............... F02K 1/82 (2013.01); F02C 6/04 (2013.01); F02C 6/18 (2013.01); F16L 27/11 (2013.01); F16L 51/025 (2013.01); F05D 2250/41 (2013.01); Y10T 137/0318 (2015.04); Y10T 137/6416 (2015.04)

(58) Field of Classification Search
CPC .. F01D 25/30; F01D 9/023; F02C 7/20; F02C 6/04; F02C 6/06; F02C 6/08; F02C 6/10; F02C 6/12; F02K 1/82

USPC ................ 60/39.822, 723, 777, 39.5, 799
See application file for complete search history.

(56) References Cited

U.S. PATENT DOCUMENTS

| 2,580,207 | A | * | 12/1951 | Whittle ........................ 60/264 |
|---|---|---|---|---|
| 3,313,517 | A | | 4/1967 | Hanschke et al. |
| 3,668,785 | A | | 6/1972 | Rodwin |
| 4,047,740 | A | | 9/1977 | Young et al. |
| 4,050,660 | A | | 9/1977 | Eggmann et al. |
| 4,696,618 | A | | 9/1987 | Fairchild et al. |
| 4,848,803 | A | | 7/1989 | Bachmann |
| 5,358,284 | A | | 10/1994 | Broyles |
| 5,378,026 | A | | 1/1995 | Ninacs et al. |
| 5,476,378 | A | | 12/1995 | Zagoroff et al. |
| 5,533,437 | A | * | 7/1996 | Howard ............ B01D 53/1487 95/144 |
| 5,653,478 | A | | 8/1997 | McGurk et al. |
| 7,150,111 | B2 | | 12/2006 | Viljanmaa |
| 7,183,328 | B2 | | 2/2007 | Hershkowitz et al. |
| 7,694,523 | B2 | | 4/2010 | Carin et al. |
| 7,882,646 | B2 | | 2/2011 | Gorbell et al. |

(Continued)

*Primary Examiner* — Craig Kim
(74) *Attorney, Agent, or Firm* — Bracewell LLP; Linda L. Morgan (57) ABSTRACT

A system for providing heated, pressurized air to a device in an industrial process, the system including at least one engine arranged and designed to heat and pressurize air, and at least one pipe attached to the at least one engine to provide a flow path for air from the at least one engine to the device in the industrial process. The system may also include an expansion joint positioned between the at least one engine and the pipe, the expansion joint arranged and designed to allow relative axial movement between the at least one engine and the pipe.

20 Claims, 3 Drawing Sheets

(56) References Cited

U.S. PATENT DOCUMENTS

| | | |
|---|---|---|
| 7,975,398 B2 | 7/2011 | Carin et al. |
| 8,450,543 B2 * | 5/2013 | Peters et al. ................. 585/240 |
| 8,696,033 B2 * | 4/2014 | Cipra ......................... 285/145.5 |
| 2002/0023423 A1 * | 2/2002 | Viteri et al. ................. 60/39.02 |
| 2004/0261285 A1 | 12/2004 | Harada |
| 2005/0101816 A1 * | 5/2005 | Xu et al. ...................... 585/639 |
| 2008/0155961 A1 * | 7/2008 | Johnson ...................... 60/226.3 |
| 2009/0076705 A1 * | 3/2009 | Colesworthy et al. ....... 701/103 |
| 2011/0005234 A1 * | 1/2011 | Hashimoto ............. F01D 25/30 60/796 |
| 2013/0144087 A1 * | 6/2013 | Arora .......................... 568/884 |

* cited by examiner

METHOD AND APPARATUS FOR SUPPLYING HEATED, PRESSURIZED AIR

CROSS-REFERENCE TO RELATED APPLICATION

This application claims the benefit of priority from U.S. Provisional Patent Application Ser. No. 61/550,156, filed Oct. 21, 2011, the disclosure of which is incorporated by reference herein in its entirety.

BACKGROUND OF INVENTION

1. Field of the Invention

The present invention relates to supplying heated, pressurized air for industrial processes. More specifically, the invention relates to the use of gas turbine or aero-derivative gas turbine engines for supplying heated, pressurized air.

2. Description of the Related Art

Many industrial processes require heated, pressurized air. This requirement can be met by using heaters in combination with compressors to reach the required temperature and pressure ranges of the air. However, such methods tend to be inefficient and costly in applications where very high heat and high pressure are needed.

In such applications, attempts have been made to use gas turbine or aero-derivative gas turbine engines to provide heated and/or pressurized air by feeding exhaust from the engines into the industrial process. To date, however, no system has been developed that is capable of allowing a gas turbine or aero-derivative gas turbine engine to provide all of the heated, pressurized air necessary to meet process requirements. Currently, for example, systems that use exhaust from such an engine often require further pressurization of the air with independent compressors. This not only adds a step to the process, but adds cost to the operation of the facility. In addition, if the engine or a compressor is shut down for maintenance or repair, or fails for some other reason, the industrial process must be stopped, leading to expensive plant shutdowns and restarting operations.

Additional problems result from the vibrations in the gas turbine or aero-derivative gas turbine engine, which tend to cause the engine to become misaligned with the piping designed to carry the exhaust to the industrial process. In addition, the piping connected to the exhaust of the gas turbine or aero-derivative engine tends to expand after start-up, creating undue stress in the joint between the piping and the exhaust, and causing allure of that joint. Furthermore, most off the shelf gas turbines or aero-derivative gas turbine engines are designed for other purposes. Accordingly, such engines are not designed to produce exhaust having the particular pressure and temperature characteristics required by a given industrial process.

SUMMARY OF THE INVENTION

Embodiments of the current application provide a system and method for addressing the shortcomings of the current art, as discussed above.

The embodiments of the current application provide a system and method that allows for engines, such as, for example, gas engines or aero-derivative gas turbine engines, to be used to supply heated, pressurized air to devices of an industrial process. In one embodiment, the engines provide the majority of the heating requirements, with a secondary heater being used, if needed, to further adjust the temperature of the air.

The engines of the embodiments of this application are preferably selected to supply the required amount of heated, pressurized air to meet process requirements. Preferably, the air that exits the engines has a pressure of, for example, about 1 to 25 psig. Where a lower pressure air is required for start-up operations, a small air compressor can be used during startup conditions. Otherwise, the engines disclosed in the below embodiments are operable to supply all of the pressurization requirements. In this manner, the engines are selected to meet the performance requirements for the ongoing operations of the industrial process, and not to meet a short term, infrequent event, such as start-up.

In addition, certain embodiments of the current application provide a plurality of engines. Accordingly, if one engine shuts down, the remaining engines provide heated, pressurized air, thereby allowing the process to stay online.

Furthermore, the systems and methods of this application reduce the energy required for heating and pressurizing the air from ambient conditions to process requirements, by performing most of the heating and pressurizing functions all within the engines. Use of the engines reduces the need for separate heaters or compressors to heat and pressurize the air. Because the engines are supplying the majority of the heat in the discharge air, the use of separate downstream heaters, if any, can be used only for fine tuning, or micro-heating the air. Because the role of any downstream heater is reduced, loss of the heater, such as, for example, for replacement or repair, will not cause a plant shutdown. In at least one embodiment, the engines supply all the heat necessary for the process during standard operation.

In this manner, the embodiments of this application serve the dual purposes of supplying an efficient means of heating and compressing air in one single step, while also maximizing reliability through use of multiple gas turbine engines.

In addition, the embodiments disclosed below include a manifold for stabilizing the engines and minimizing movement between system parts. Also disclosed are expansion joints for placement between the engines and other system parts, which allows for sonic relative movement between the engine and the other system parts. The manifolds and expansion joints are operable to dampen and manage vibrations and other movements associated with the engines that could otherwise be problematic.

An embodiment of the present technology provides a system for providing heated, pressurized air to a device in an industrial process. The system includes an engine arranged operable to heat and pressurize air, a pipe operatively attached to the engine to provide a flow path for air from the engine to the device in the industrial process, and an axially expandable expansion joint positioned between the engine and the pipe. The engine can be a gas turbine engine or an aero-derivative gas turbine engine. The expansion joint has a hollow throughbore that allows the passage of fluids, and is preferably arranged to allow relative axial movement between the engine and the pipe.

The system can also include a manifold connected to the engine, to substantially constrain movement of the engine relative to the pipe in a non-axial direction. Furthermore, the system can include a nozzle located in the flow path between, and in fluid communication with, the engine and the device in the industrial process, the nozzle tapering from a larger diameter toward the engine, to a smaller diameter in a central portion of the nozzle, and back to a larger diameter toward the device in the industrial process, so that as air passes through the nozzle, the flow rate of the air increases and the pressure decreases. A heater can be positioned between the engine and the device, to further adjust the temperature of the air. In one certain embodiment, the process device is a reaction chamber, and the industrial process is a polypropylene manufacturing process.

Another embodiment of the current application provides a system for providing heated, pressurized air to a process device associated with an industrial process. The system includes an engine in fluid communication with the process device and having an air intake end, and exhaust end, and a central axis. The engine is preferably operable to intake air at the intake end, to heat and pressurize the air, and to expel heated, pressurized air at the exhaust end to the process device, the heated, pressurized air being of sufficient temperature and pressure to meet the needs of the process device. Although the system can run with one engine, for the sake of redundancy the number of engines can be at least two, with the number preferably selected such that the process device can continue operating if one engine is not providing heated, pressurized air to the process device.

The system can further include a pipe for transporting the heated, pressurized air from the exhaust end of the engine to the process device, the pipe having a central axis co-linear with the central axis of the exhaust end of the engine, and being in fluid communication with the exhaust end of the engine. The system can also include a substantially immovable base and a manifold rigidly securing the exhaust end of the engine to the substantially immovable base. The manifold can include a support rigidly attached to the base. The support can have a top section, two legs, and a ring shaped member located between the two legs, wherein the ring shaped member substantially surrounds the exhaust end of the engine.

In some embodiments, the system can further include an expansion joint which can be located between the pipe and the exhaust end of the engine. The expansion joint preferably has a central axis co-linear with the central axis of the pipe and the exhaust end of the engine, and allows for axial relative movement between the pipe and the exhaust end of the engine.

In certain embodiments, the engine includes a compressor section for pressurizing air that enters through the air intake to produce pressurized air, a combustion section in fluid communication with the compressor section for heating the pressurized air that enters from the compressor section to produce heated, pressurized air, and a turbine section in fluid communication with the combustion section and having a rotatable blade, the turbine section being arranged to direct the flow of the heated, pressurized air into contact with the rotatable blade such that the rotatable blade rotates. The engine also includes a shaft having a first end and a second end, the first end operatively coupled to the rotatable blade of the turbine section so that the shaft rotates with the blade. The second end can be connected to the compressor section so that as the shaft rotates it provides energy to the compression section.

After passing through the turbine section, the heated, pressurized air is expelled from the engine through the exhaust end of the engine. Upon leaving the exhaust end of the engine, the air preferably is at a pressure that is above atmospheric pressure. In one embodiment, the air leaves the exhaust end at a pressure of about 15-25 psig, and more preferably at a pressure of about 20 psig.

Yet another embodiment of the current application includes a method for providing heated, pressurized air for an industrial process. The method includes the step of drawing ambient air into engine, the engine having an intake end, an exhaust end, and a central axis, wherein the air is drawn into the intake end of the engine. The method further includes the steps of heating and pressurizing the air within the engine, and expelling the heated, pressurized air from the exhaust end of the engine, the heated, pressurized air being of sufficient heat and pressure to meet the needs of a process device of an industrial process. In addition, the method further includes the steps of transporting the heated, pressurized air from the exhaust end of the engine to the process device of the industrial process with a pipe, the engine being secured to an immovable base so as to prevent substantially all non-axial movement of the engine relative to the pipe.

In another embodiment of the method, the method can further include the step of absorbing relative axial movement between the pipe and the exhaust end of the engine through an expansion joint therebetween, the expansion joint attached at one end to the pipe and at the other end to the exhaust end of the engine, wherein the expansion joint is configured to expand and contract in an axial direction to allow relative axial motion between the pipe and the exhaust end of the engine.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above can be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention can admit to other equally effective embodiments.

DETAILED DESCRIPTION OF THE EXEMPLARY EMBODIMENTS

The forgoing aspects, features, and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

Figure 1:
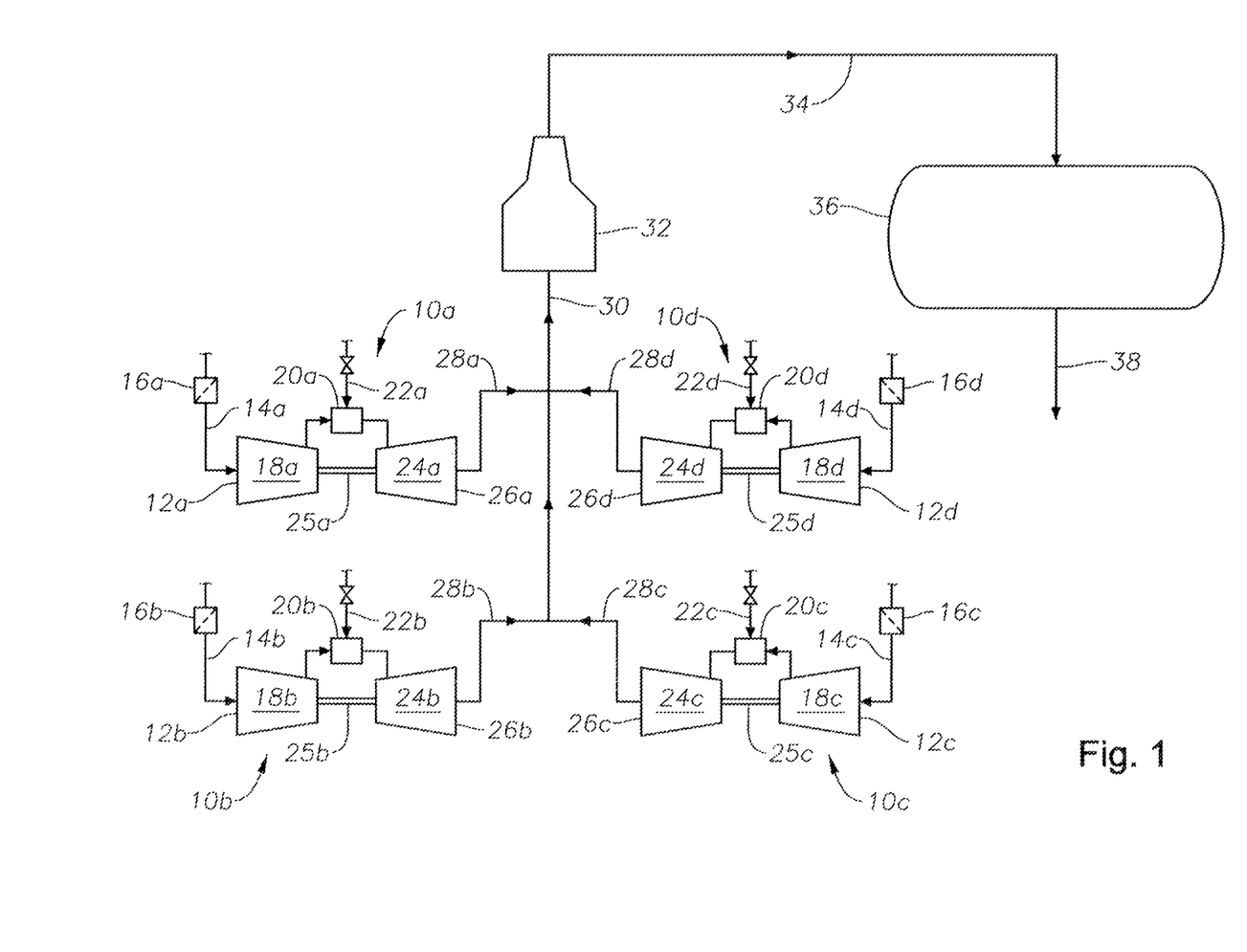
FIG. 1 is a schematic flow diagram of an embodiment of the air supply system of the current application.
Figure 2:
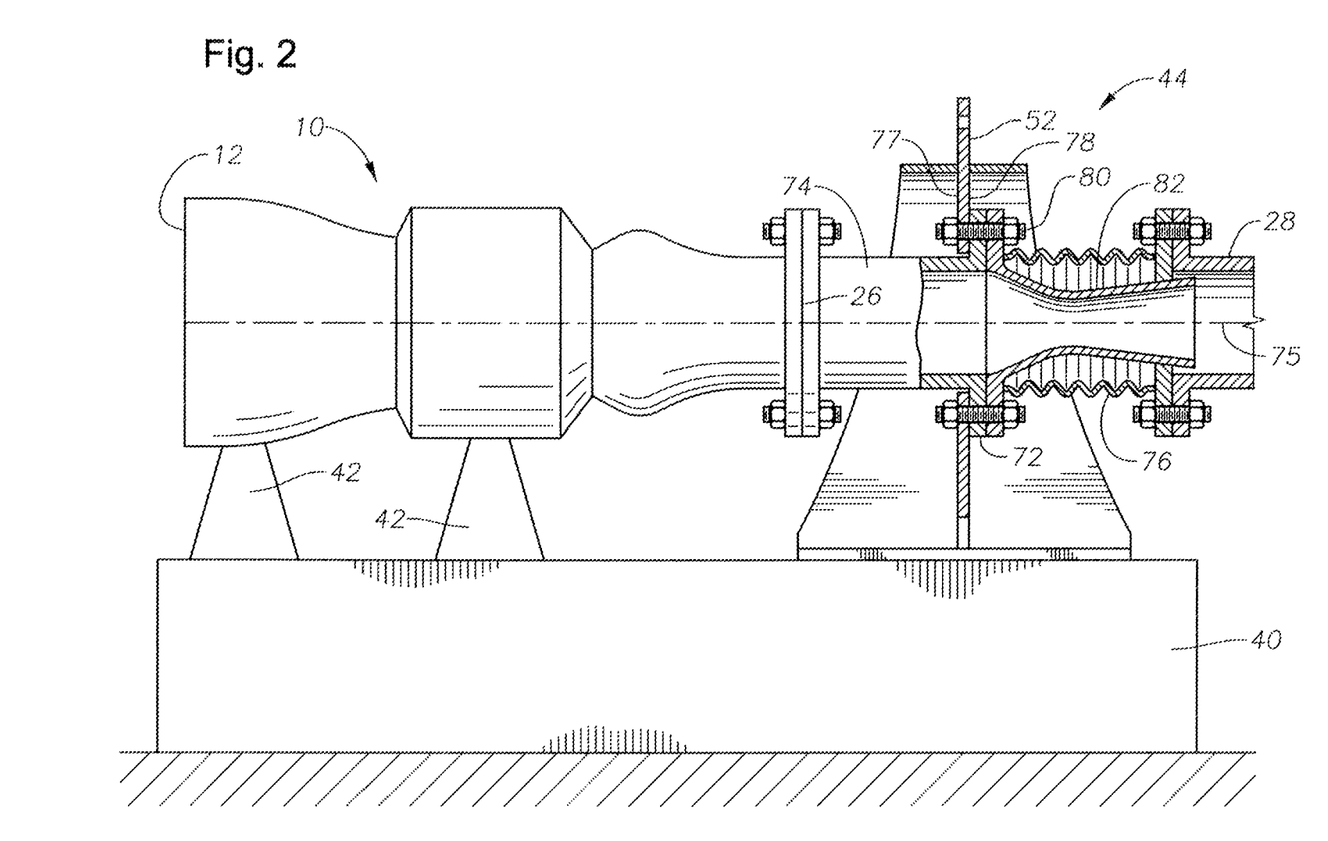
FIG. 2 is a partial sectional side view of a portion of the air supply system of FIG. 1.

Looking at FIG. 1, embodiment of a system for providing heated, pressurized air includes four engines 10a, 10b, 10c, 10d. Although the engines shown in FIGS. 1 and 2 are generic industrial gas turbines, it is to be understood that other types of engines could be used as well. For example, the engines could be aero-derivative gas turbine engines. Aero-derivative gas turbine engines are those that use the hot gases produced by a jet engine to drive the turbine. In alternate embodiments, less than four, and as few as one, engine can be used when the engine's output is sufficient to meet the demand of the applicable industrial process. Alternately, more than four engines can be used where the air output requirement is higher or an increased level of redundancy is desirable. The make and number of engines 10a, 10b, 10c, 10d can be selected so that even upon the failure or shut down of one engine 10a, 10b, 10c, 10d, the remaining engines produce sufficient quantities of heated, pressurized air so the industrial process they supply will not have to be shut down. Engines 10a, 10b, 10c, 10d can be of similar or different makes and models. Using engines 10a, 10b, 10c, 10d to supply heated, pressurized air to an industrial process minimizes overall energy consumption compared to use of air compressors and heaters by combining the heating and pressurization of the air into one step. This minimization of energy consumption reduces capital expenses. Moreover, because the heating and pressurization steps are carried out within a single piece of equipment (the engine), the footprint of the system is reduced at a process facility.

Each engine 10a, 10b, 10e, 11d includes a compressor section 18a, 18b, 18c, 18d having an air intake end 12a, 12b, 12c, 12d. Air is drawn into the compressor section 18a, 18b, 18c, 18d at the air intake end 12a, 12b, 12c, 12d through intake line 14a, 14b, 14c, 14d. Air passing through intake line 14a, 14b, 14c, 14d can first pass through a filter 16a, 16b, 16c, 16d before entering the compressor section 18a, 18b, 18c, 18d of the engine. In the compression section, the air is pressurized by compression. Such pressurization of the air can add heat. After being pressurized, the air flows to a combustion section 20a, 20b, 20c, 20d where a fuel is added by way of fuel line 22a, 22b, 22c, 22d. Within the combustion section 20a, 20b, 20c, 20d, the air is mixed with the fuel to form an air/fuel mixture, and the air/fuel mixture is combusted. This combustion heats the air.

The heated, pressurized air in the combustion section 20a, 20b, 20c, 20d is then forced into the turbine section 24a, 24b, 24c, 24d where the air is expanded and accelerated. The air passing through the turbine section 24a, 24b, 24c, 24d rotates blades (not shown) within the turbine section 24a, 24b, 24c, 24d, which in turn rotate a shaft 25a, 25b, 25c, 25d that is connected to the compressor section 18a, 18b, 18c, 18d. The rotating shaft provides the rotational force required to operate the compressor section 18a, 18b, 18c, 18d. The air then leaves the turbine section 24a, 24b, 24c, 24d as exhaust gas through exhaust piping 28a, 28b, 28c, 28d at an exhaust end 26a, 26b, 26c, 26d of the turbine section 24a, 24b, 24c, 24d. Typically, not all of the energy generated in the turbine section is used to rotate the shall. As a result, exhaust gas leaving the turbine section is heated, and pressurized above atmospheric pressure. For example, the pressure of the exhaust gas leaving the exhaust end 26a, 26b, 26c, 26d can be in the range of about 15-25 psig, and in one embodiment can be about 20 psig.

In embodiments having more than one engine, exhaust piping 28a, 28b, 28c, 28d directs the exhaust gas from each of the engines 10a, 10b, 10c, 10d to a single pipeline 30. As shown in the embodiment of FIG. 1, pipeline 30 can optionally carry the exhaust gas to a heater 32. When the exhaust gas arrives at the heater 32, the engines 10a, 10b, 10c, 10d have already substantially heated the air, as discussed above. Therefore, the heater 32 is can be useful to further adjust the temperature, or micro-heat the air, thereby providing greater control of the temperature.

In another embodiment, the exhaust gas from the engines 10a, 10b, 10c, 10d can reach the desired temperature without the use of the heater 32. In such an embodiment, the heater 32 can be eliminated. Moreover, engines 10a, 10b, 10c, 10d can be selected so that in combination, they provide exhaust gas with a temperature in the range required by the industrial process without further heating. In that case, the operator would have sufficient control over the output of the engines 10a, 10b, 10c, 10d to allow the engines 10a, 10b, 10c, 10d to be adjusted to generate exhaust gas which has the temperature and pressure required by a particular industrial process.

Referring back to the embodiment shown in FIG. 1, when the air leaves heater 32, it is ready to be delivered via pipeline 34 to the required process device 36. Process device 36 can be, for example, a reaction chamber. Air will then depart the process device 36 through an exit conduit 38 and can be, for example, vented to the environment. Alternately, the air can be used in other areas of the industrial process or sent to a waste heat boiler or heat recovery device to recover energy from the air stream prior to releasing to the atmosphere.

Turning now to FIG. 2, an engine 10 is shown rigidly mounted to a substantially immovable base 40. Any number of supports 42 of appropriate size and shape can be used to secure engine 10 to substantially immovable base 40. A pipe segment 74 can be connected to exhaust end 26 of the engine 10. Pipe segment 74 is in turn attached to, and in fluid communication with, an expansion joint 76. As used herein, the term fluid refers to either a liquid or a gas. Pipe segment 74 can function as a transition piece and be removable for access to the engine 10 for maintenance or repair purposes. Pipe segment 74 can be connected to exhaust end 26 of the engine 10 by any appropriate attachment means, such as, for example, with clamps, with flanges and bolts (as shown), or by any other known means. These attachment means can be made up without being tight because, after the system is started, thermal expansion can take up any slack in the attachment means.

The manifold 44 is preferably located proximate to exhaust end 26 of engine 10 and connected to pipe segment 74. In alternate embodiments, pipe segment 74 can be omitted or bypassed, and instead manifold 44 can be connected directly to exhaust end 26 of the engine 10. Manifold 44 preferably sits on, and is rigidly secured to, substantially immovable base 40. Manifold 44 substantially stabilizes exhaust end 26 and pipe segment 74, and maintains alignment between the exhaust end 26 of engine 10 and piping 28, which transports the exhaust gas away from the engine 10. As explained more fully below, manifold 44 is operable to maintain this alignment, despite the vibrations generated by the engine 10.

Figure 3:
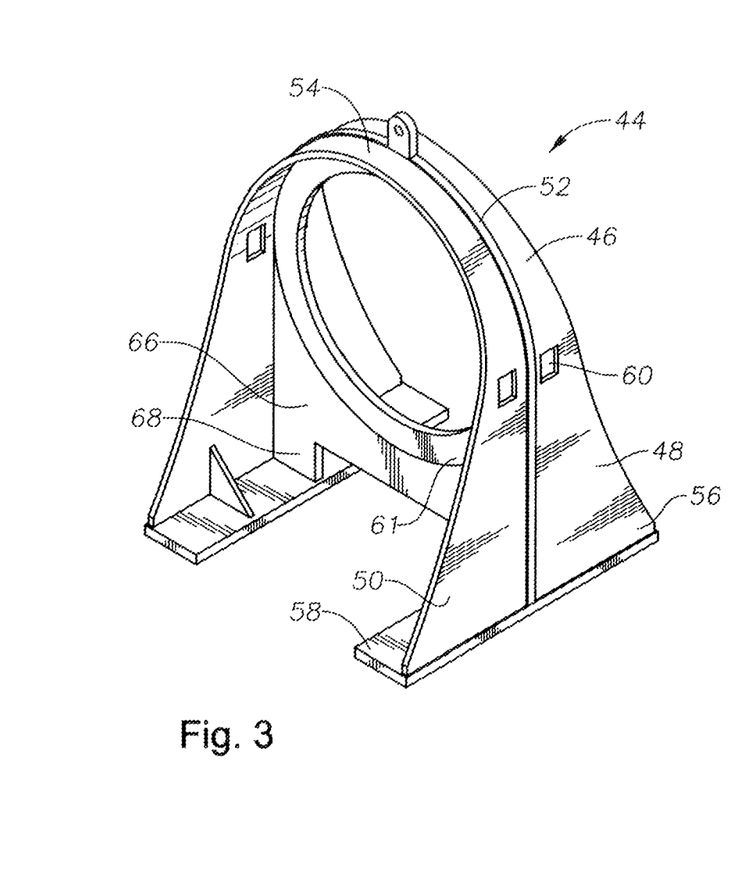
FIG. 3 is a perspective view of the manifold of an embodiment of the current application.

As shown in FIG. 3, manifold 44 includes an inverted U-shaped support 46. In this embodiment, U-shaped support 46 includes two arched members 48, 50 located on either side of a central vertical plate 52, so that vertical plate 52 is sandwiched between arched members 48, 50. U-shaped support 46 meets substantially immovable base 40 on either side of exhaust end 26, pipe segment 74, and an expansion joint 76 (discussed below) and substantially surrounds the sides and top of such elements (substantially immovable base 40, exhaust end 26, pipe segment 74, and expansion joint 76 are all shown in FIG. 2). U-shaped support 46 can be narrower at its top section 54 and wider at the base 56 of each of its legs 68. Below each leg 68 is a horizontal plate 58 which extends the length of the base 56 and the width of the legs 68 (see also FIG. 4). Each arched member 48, 50 can have openings 60 to allow for observations of the interior of U-shaped support 46, or access to the interior of U-shaped support 46, for performing any required operations therein.

Figure 4:
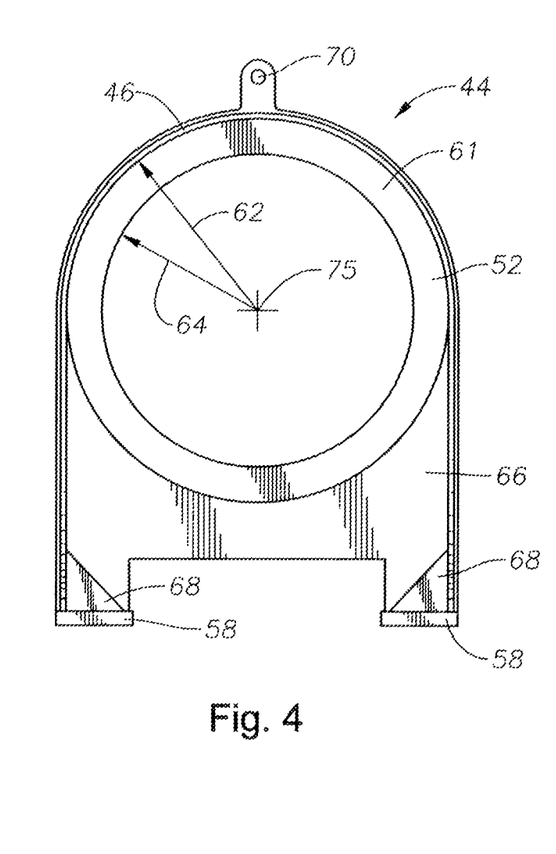
FIG. 4 is an elevation view of the manifold of FIG. 3.

As shown in FIG. 4, vertical plate 52 includes a ring shaped member 61 and a lower base member 66. Ring shaped member 61 can have an outer radius 62 that is substantially concentric to the radius of the top of U-shaped support 46, and an inner radius 64 that is substantially equal to, or larger than the radius of the pipe segment 74, so that pipe segment 74 can pass through ring shaped member 61. Lower base member 66 is situated below ring shaped member 61 and has an upper profile that corresponds to the outer radius 62 of the ring shaped member 61. Lower base member 66 includes the legs 68, which contact horizontal plates 58. An eye 70 can be positioned at the top of the U-shaped support 46 to allow for easier transportation of the manifold 44.

Referring back to FIG. 2, the vertical plate 52 is preferably connected to the pipe segment 74 by a connection means 80. In some embodiments, this can be accomplished by fastening vertical plate 52 to a flange 72 of pipe segment 74. With the pipe segment 74 secured thereto, the manifold substantially constrains movement of the pipe segment in any direction other than an axial direction. In alternate embodiments, pipe segment 74 can be attached to the vertical plate 52 by clamps or other known means. In some embodiments, including, for example, some that utilize multiple engines, piping stresses can not require the use of the manifold 44. When the system shown in FIG. 2 is assembled, the engine 10, pipe segment 74, ring shaped member 61 (shown in FIGS. 3 and 4) of the manifold 44, and exhaust piping 28 have longitudinal axes that are preferably substantially co-axial about a common axis 75.

The expansion joint 76 is axially expandable, and is situated between the exhaust end 26 of the engine 10 and the exhaust piping 28 which transports the exhaust gasses. Expansion joint 76 defines a hollow throughbore that allows passage of fluids, and can be, for example, a single-ply bellows style expansion joint. Expansion joint 76 preferably allows for the components along common axis 75 to undergo thermal, or other types, of axial expansion and contraction while maintaining proper alignment with the exhaust end 26 of the engine 10. Thus, expansion joint 76 allows axial movement of exhaust piping 28 relative to the exhaust end 26 of the engine 10, while manifold 44 limits non-axial movement.

A convergent divergent nozzle 82 can also be attached to pipe segment 74 and located substantially within the expansion joint 76 and piping 28. The convergent divergent nozzle 82 preferably tapers from a larger diameter toward the exhaust end 26 of the engine 10, near the pipe segment 74, to a smaller diameter in a central portion of the nozzle, and then back to a larger diameter toward the process device 36. The exhaust gas which can, for example, have a pressure as high as 45 psig when it leaves the exhaust end 26 of the engine, enters the nozzle 82 via the pipe segment 74. Convergent divergent nozzle 82 is used to reduce the pressure of the exhaust gas to the operating pressure of the industrial process, and ensures that the flow rate of the exhaust gas through the nozzle is always maintained above sonic velocity so that the engine 10 is isolated from any downstream pressure surges or spikes from the industrial process. Accordingly, any pressure swings within piping 28, which can cause an increase in pressure in a reverse direction through piping 28 towards engine 10, is arrested in nozzle 82, thereby protecting the engine, and in particular the turbine blades, from damage.

Each of the exhaust end 26 of engine 10, pipe segment 74, expansion joint 76, convergent divergent nozzle 82, and exhaust piping 28 have central cavities in fluid communication with each other, the central cavities each having an axis co-linear with common axis 75. Similarly, ring shaped member 61 has an axis co-linear with axis 75. In embodiments where the exhaust end 26 of engine 10 passes through ring shaped member 61, the central axis of the exhaust end 26 of engine 10 and ring shaped member 61 are co-axial. Vertical plate 52 has a turbine side surface 77 which faces towards the intake end 12 of engine 10 and a pipe side surface 78 which faces towards pipeline 28. Plate surfaces 77, 78 are preferably substantially perpendicular to axis 75.

One embodiment of the present application includes a method for providing heated, pressurized air for an industrial process. The method includes the steps of drawing air into the intake end of at least one engine, and then heating and pressurizing the air within the engine, as described above. The heated, pressurized air is then expelled from the exhaust end of the engine, the heated, pressurized air being of sufficient heat and pressure to meet the needs of a process device of an industrial process. The method further includes connecting the exhaust end of the engine to the process device of the industrial process with a pipe, and securing the engine to a substantially immovable base so as to prevent substantially all non-axial movement of the at least one engine relative to the pipe.

Another embodiment of the method optionally includes absorbing relative axial movement between the pipe and the exhaust end of the engine by inserting an expansion joint therebetween. The expansion joint is preferably attached at one end to the pipe and at the other end to the exhaust end of the engine. Furthermore, the expansion joint is configured to expand and contract in an axial direction to allow relative axial motion between the pipe and the exhaust end of the engine.

Example

This example provides information relating to an industrial process with which an embodiment of the current application can be used. Although the following description of the example includes the reference numbers from FIG. 1, it is to be understood that that the example is also applicable to other embodiments as well. In the example, the industrial process requires air to reach the process device 36 with the following parameters:
Temperature: 1200 to 1250 deg F.
Pressure: 10 to 15 psig
Flow Rate: 2,000,000 to 2,500,000 lbs per hour In order for air to arrive at the process device 36 meeting those parameters, and taking losses into account, the exhaust gases from the engines 10a, 10b, 10e, 10d are designed to have the following output parameters:
Temperature: 1180 to 1230 deg F.
Pressure: 25 to 35 psig
Flow Rate: 2,000,000 to 2,500,000 lbs per hour If four carefully selected engines 10a, 10b, 10c, 10d were used for this application, the temperature, pressure, and flow parameters could be met and if one engine 10a, 10b, 10c, 10d fails or is shut down, or is otherwise not in service, operations could continue.

Although the exhaust gases of the engines 10a, 10b, 10c, 10d as designed meet the temperature requirements, some adjustment of the pressure can be necessary. Furthermore, because adjustments to the pressure can affect the temperature, it can be useful to add a separate heater 32, similar to the heater 32 of FIG. 1, to allow for fine tuning of the temperature of the exhaust gasses. A heater 32 with the following design parameters can therefore be situated between the exhaust gas piping 30 and the process device 36:

Flow Rate: 2,000,000 to 2,500,000 lbs/hr
Inlet temperature range: 250 to 1230 deg F.
Outlet temperature range: 1200 to 1250 deg F.
Design Fire Rate: 140 MMBTU/hr Use of the heater 32 will allow more freedom for the operator to adjust the output of the engines 10a, 10b, 10c, 10d to meet the pressure requirements while using the heater 32 to adjust for any minor heating requirements. It should be noted that if the heater 32 fails or is shut down, the temperature of the exhaust gasses from the engines 10a, 10b, 10c, 10d would still be sufficient to run the process device 36, and the facility would not have to be shut down.

In operation, if, during start-up, cooler air is required than what the engines 10a, 10b, 10c, 10d can produce, the exhaust gasses from the engines 10a, 10b, 10c, 10d can be mixed with output air from a separate compressor (not shown) to provide cooler pressurized air to the process device 36. Once the start-up process has been completed, the process device 36 will require air with the parameters as set forth above and the separate compressor can be turned off. For this example, the industrial process can be, for example, a propylene plant and the process device can be a reactor.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise. Optional or optionally means that the subsequently described event or circumstances can or can not occur. The description includes instances where the event or circumstance occurs and instances where it does not occur. Ranges can be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A system for providing heated, pressurized exhaust gases to a device in an industrial process, the system comprising:
   an engine arranged to heat and pressurize air;
   a pipe operatively attached to the engine to provide a flow path for exhaust gases from the engine to the device in the industrial process; and
   an expansion joint positioned between the engine and the pipe, the expansion joint having a hollow throughbore that allows the passage of a fluid, and arranged to allow relative axial movement between the engine and the pipe, the expansion joint configured to expand and contract in an axial direction by expanding and contracting a plurality of folds of a corrugated bellows of the expansion joint.

2. The system of claim 1, further comprising:
   a manifold connected to the engine, to substantially constrain movement of the engine relative to a base that is stationary during operation of the system.

3. The system of claim 1, further comprising:
   a nozzle located in the flow path between, and in fluid communication with, the engine and the device in the industrial process, the nozzle tapering from a larger diameter toward the engine, to a smaller diameter in a central portion of the nozzle, and back to a larger diameter toward the device in the industrial process, so that as exhaust gases passes through the nozzle, the flow rate of the exhaust gases increases and the pressure decreases.

4. The system of claim 1, wherein the engine is selected from the group consisting of a gas turbine engine and an aero-derivative gas turbine engine.

5. The system of claim 1, further comprising
   a heater positioned between the engine and the device operable to further adjust the temperature of the exhaust gases.

6. The system of claim 1, wherein the device in the industrial process is a reaction chamber.

7. The system of claim 1, wherein the industrial process is a reaction chamber of a polypropylene manufacturing process.

8. A system for providing heated, pressurized exhaust gases to an industrial process, the system comprising:
   a process device associated with the industrial process;
   an engine in fluid communication with the process device and having an air intake end, an exhaust end, and a central axis, the engine being operable to intake air at the intake end, to heat and pressurize the air, and to expel heated, pressurized exhaust gases at the exhaust end to the process device, the heated, pressurized exhaust gases being of sufficient temperature and pressure to meet the needs of the process device;
   a manifold located downstream of the exhaust end of the engine and extending to a base rigidly securing the exhaust end of the engine to the base, the base being stationary during operation of the system;
   a pipe for transporting the heated, pressurized exhaust gases from the exhaust end of the engine to the process device, the pipe being downstream of the exhaust end of the engine; and
   an expansion joint positioned between the manifold and the pipe, the expansion joint arranged to allow relative axial movement between the exhaust end of the engine and the pipe.

9. The system of claim 8, wherein the manifold comprises:
   a support rigidly attached to the immovable base, the support having a top section, two legs, and a ring shaped member located between the two legs, wherein the ring shaped member substantially surrounds the exhaust end of the engine.

10. The system of claim 8, wherein:
    the expansion joint has a central axis co-linear with the central axis of the pipe and the exhaust end of the engine, the expansion joint configured to expand and contract in an axial direction by expanding and contracting a plurality of folds of a corrugated bellows of the expansion joint.

11. The system of claim 8, wherein there are at least two engines, and the engines are selected such that the process device can continue operating if one engine is not providing heated, pressurized exhaust gases to the process device.

12. The system of claim 8, wherein the engine further comprises:
- a compressor section for pressurizing air that enters through the air intake to produce pressurized air;
- a combustion section in fluid communication with the compressor section for heating the pressurized air that enters from the compressor section to produce heated, pressurized air;
- a turbine section in fluid communication with the combustion section and having a rotatable blade, the turbine section arranged to direct the flow of the heated, pressurized air into contact with the rotatable blade such that the rotatable blade is rotated; and
- a shaft having a first end and a second end, the first end operatively coupled to the rotatable blade of the turbine section so the shaft rotates with the blade, and a second end connected to the compressor section and arranged to provide energy to the compressor section as the shaft turns.

13. The system of claim 12, wherein the turbine section directs the heated, pressurized exhaust gases through the exhaust end of the engine, and the pressure of the heated, pressurized exhaust gases at the exhaust end is above atmospheric pressure.

14. The system of claim 8, further comprising:
- a nozzle positioned between, and in fluid communication with, the exhaust end of the engine and the pipe, the nozzle defining a passage that tapers from a larger diameter toward the exhaust end, to a smaller diameter in a central portion of the nozzle, and the back to a larger diameter toward the pipe, so that as the exhaust gases pass through the nozzle, the flow rate of the exhaust gases increases and the pressure decreases.

15. The system of claim 13, wherein the pressure of the heated, pressurized exhaust gases at the exhaust end is in the range of about 15-25 psig.

16. The system of claim 15, wherein the pressure of the heated, pressurized exhaust gases at the exhaust end is about 20 psig.

17. The system of claim 8, wherein the engine is selected from the group consisting of a gas turbine engine and an aero-derivative gas turbine engine.

18. A method for providing heated, pressurized exhaust gases for an industrial process, the method comprising the steps of:
- drawing ambient air into an engine, with the engine having an intake end, an exhaust end, and a central axis, wherein the air is drawn into the intake end of the engine;
- heating and pressurizing the air within the engine;
- expelling heated, pressurized exhaust gases from the exhaust end of the engine, the heated, pressurized exhaust gases being of sufficient heat and pressure to meet the needs of a process device of an industrial process;
- transporting the heated, pressurized exhaust gases from the exhaust end of the engine to the process device of the industrial process with a pipe that is downstream of the exhaust end of the engine, the engine being secured to a base with a manifold that is located downstream of the exhaust end of the engine and extends to the base so as to prevent substantially all non-axial movement of the engine relative to the pipe, the immovable base being stationary during operation of the system; wherein
- an expansion joint is positioned between the manifold and the pipe, the expansion joint allowing relative axial movement between the exhaust end of the engine and the pipe.

19. The method of claim 18, further comprising the step of:
- absorbing relative axial movement between the pipe and the exhaust end of the engine through an expansion joint therebetween, the expansion joint attached at one end to the pipe and at the other end to the exhaust end of the engine, wherein the expansion joint is configured to expand and contract in an axial direction to allow relative axial motion between the pipe and the exhaust end of the engine.

20. The system of claim 8, wherein the expansion joint includes a corrugated bellows member with a plurality of folds and the expansion joint is configured to expand and contract in an axial direction by expanding and contracting the plurality of folds.

* * * * *